United States Patent
Ukani

[11] Patent Number: 6,018,432
[45] Date of Patent: Jan. 25, 2000

[54] DISC DRIVE OPERATIONAL RESPONSE USING IDLE MODE COMPENSATION

[75] Inventor: Anish A. Ukani, Oklahoma City, Okla.

[73] Assignee: Seagate Technology, Inc., Scotts Valley, Calif.

[21] Appl. No.: 08/880,814

[22] Filed: Jun. 23, 1997

Related U.S. Application Data

[60] Provisional application No. 60/028,883, Oct. 17, 1996.

[51] Int. Cl.$^7$ .................................................. G11B 15/18
[52] U.S. Cl. .............................................. 360/69; 360/39
[58] Field of Search ................................. 360/69, 75, 76, 360/77.02, 77.04, 77.06, 77.17, 78.04, 78.07, 39; 369/44.27, 44.28, 44.32, 58, 54

[56] References Cited

U.S. PATENT DOCUMENTS

| | | |
|---|---|---|
| 5,262,907 | 11/1993 | Duffy et al. . |
| 5,276,662 | 1/1994 | Shaver, Jr. et al. . |
| 5,305,160 | 4/1994 | Funches et al. . |
| 5,369,345 | 11/1994 | Phan et al. . |
| 5,422,760 | 6/1995 | Abbott et al. . |
| 5,459,757 | 10/1995 | Minuhin et al. . |
| 5,475,545 | 12/1995 | Hampshire et al. . |
| 5,539,714 | 7/1996 | Andrews et al. ................. 360/77.04 X |
| 5,566,095 | 10/1996 | Cameron et al. . |
| 5,585,976 | 12/1996 | Pham . |
| 5,592,340 | 1/1997 | Minuhin et al. . |
| 5,631,999 | 5/1997 | Dinsmore . |
| 5,835,302 | 11/1998 | Funches et al. ................. 360/77.04 X |

OTHER PUBLICATIONS

Finch and Moczarny, "Headerless disk formatting: Making room for more data," Data Storage Magazine, Apr. 1997, pp. 51, 52, and 54, vol. 4, No. 5, Pennwell Publishing Co., Tulsa, Oklahoma.

*Primary Examiner*—Muhammad Edun
*Attorney, Agent, or Firm*—Crowe & Dunlevy

[57] ABSTRACT

Method and apparatus for improving the operational response of a disc drive. Compensation routines are performed to adjust disc drive parameters in accordance with existing environmental conditions during an idle mode of operation of the drive. At such time that a selected, uninterrupted amount of time passes since the most recently performed disc drive operation, the disc drive enters the idle mode and performs a predetermined sequence of the compensation routines, after which the disc drive performs dithering in which heads of the disc drive are positioned about various locations with respect to the corresponding discs of the disc drive. A compensation table is provided setting forth the predetermined sequence of the compensation routines and the table is reordered so that the compensation routines are subsequently performed in a different sequence.

5 Claims, 3 Drawing Sheets

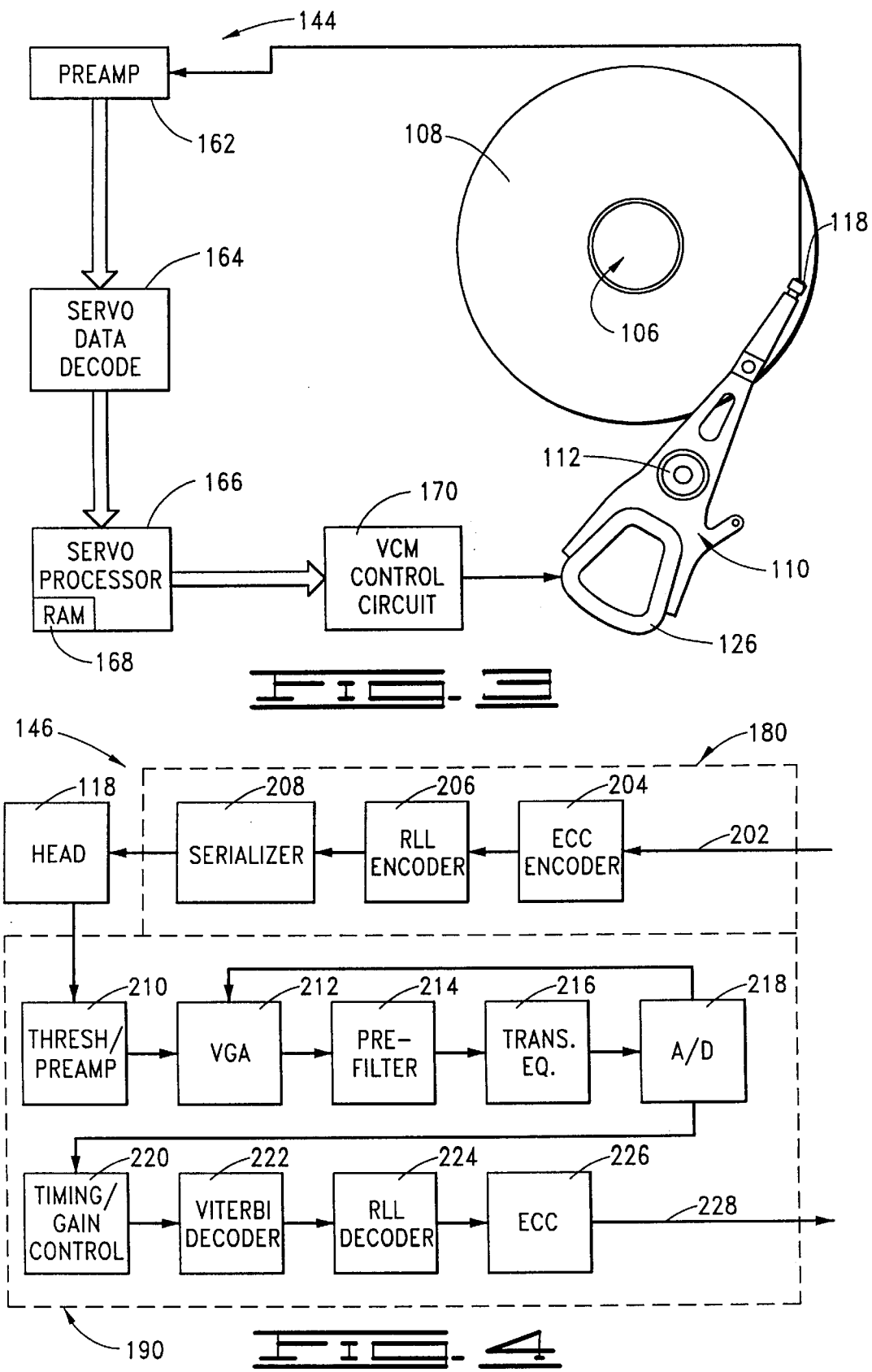

| 1 | SERVO GAIN CALIBRATION |
| 2 | REPEATABLE RUN OUT COMPENSATION |
| 3 | VCM TORQUE COMPENSATION |
| 4 | BIAS FORCE COMPENSATION |
| 5 | ADAPT READ CHANNEL |
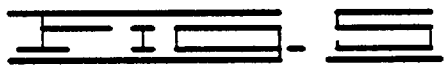
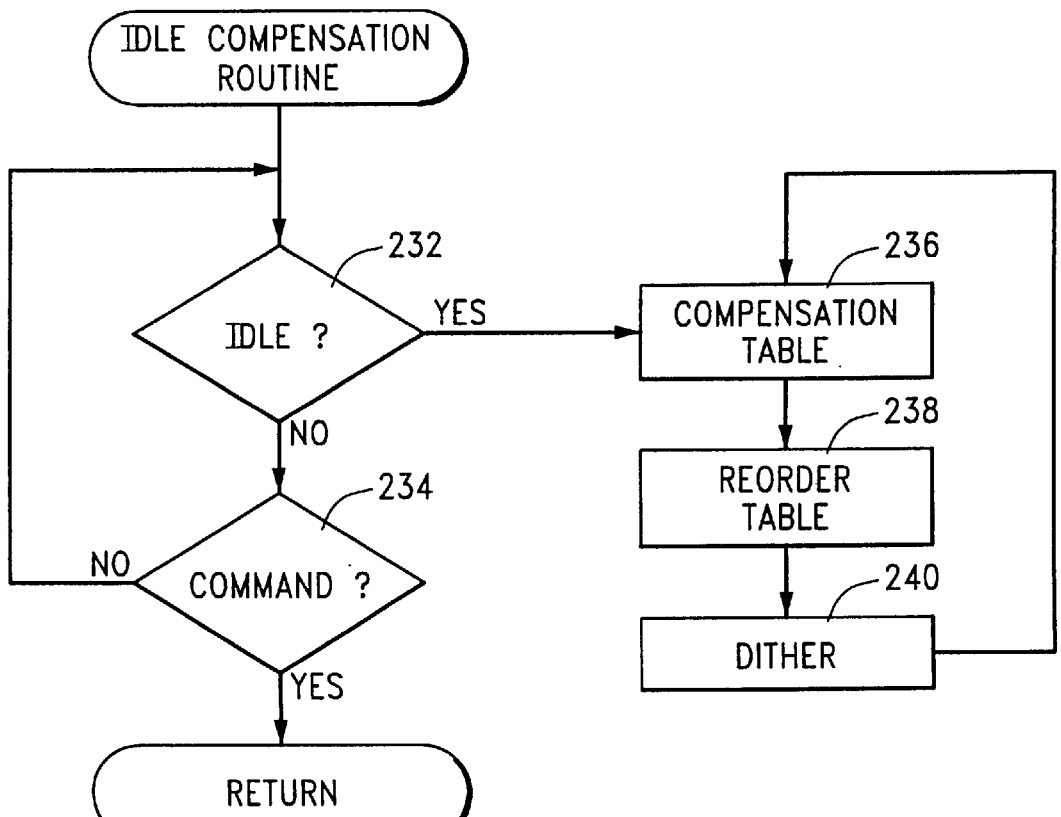

DISC DRIVE OPERATIONAL RESPONSE USING IDLE MODE COMPENSATION

Cross-Reference to Related Applications

This application claims priority to U.S. Provisional Application No. 60/028,883 filed Oct. 17, 1996.

FIELD OF THE INVENTION

The present invention relates generally to the field of disc drive devices and more particularly, but without limitation, to improving the operational response of a disc drive through the execution of compensation routines during an idle mode of operation to compensate for changes in environmental conditions associated with the disc drive.

BACKGROUND

Data storage devices of the type known as "Winchester" or "hard" disc drives are typically provided with a plurality of rigid discs that are coated with a magnetizable medium and mounted on the hub of a spindle motor for rotation at a constant high speed. A controllably positionable actuator is disposed adjacent the discs, the actuator including a plurality of heads which are used during write and read operations to store and retrieve user data from tracks defined on the disc surfaces.

A closed loop servo system is used to control the position of the heads with respect to the tracks on the disc. More particularly, the actuator typically includes a coil of a voice coil motor (VCM) so that currents applied to the coil by the servo system cause the heads to move relative to the tracks in a controlled manner. A read/write channel, responsive to the heads, controls the transfer of user data between the discs and a host computer in which the disc drive is mounted.

As will be recognized, advances in the disc drive industry have led to continual increases in disc drive storage capacities and data transfer rates, necessitating ever increasing complexity in the control systems used to maintain proper operation of the drives. Accordingly, compensation routines for various disc drive systems have been developed so that disc drives can achieve optimum performance in light of changes in operational and environmental conditions. Typical compensation routines are disclosed by, for example U.S. Pat. No. 5,566,095 entitled FAST CALIBRATION USING MICROSTEPS, issued Oct. 15, 1996 to Cameron et al. (servo gain calibration); U.S. Pat. No. 5,585,976 entitled DIGITAL SECTOR SERVO INCORPORATING REPEATABLE RUN OUT TRACKING, issued Dec. 17, 1996 to Pham (compensation for repeated run out components in servo position error signals); U.S. Pat. No. 5,305,160 entitled COMPENSATING FOR VARIATIONS IN TORQUE CAPABILITY OF VOICE COIL MOTORS, issued Apr. 19, 1994 to Funches et al. (VCM torque compensation); U.S. Pat. No. 5,369,345 entitled METHOD AND APPARATUS FOR ADAPTIVE CONTROL, issued Nov. 29, 1994 to Phan et al. (flexure bias force compensation); and U.S. Pat. No. 5,592,340 entitled COMMUNICATION CHANNEL WITH ADAPTIVE, ANALOG TRANSVERSAL EQUALIZER, issued Jan. 7, 1997 to Minuhin et al. (read/write channel filter compensation). All of these references are assigned to the assignee of the present invention.

It will be recognized that changes in external environmental conditions such as temperature, humidity and supply voltage levels can adversely affect the operational performance of a disc drive and that the infrequent or periodic performance of compensation routines such as those disclosed in the above identified references may not provide adequate compensation for such changes in environmental conditions. Moreover, it will be recognized that after a period of disc drive inactivity (such as during an "idle" mode of operation), the data transfer rate of the drive may be adversely impacted for a period of time immediately following a command to transfer data until such time that various compensation parameters can be optimized for the existing environmental conditions. As will be recognized, compensation routines can require a relatively significant amount of time to complete, which can adversely affect the ability of the disc drive to immediately commence with the transfer of data.

In order to address this problem, some prior art disc drives have employed environmental sensors to sense changes in environmental conditions and invoke appropriate compensation routines to adjust the compensation parameters accordingly. However, such an approach undesirably adds significant amounts of further complexity and cost to the disc drives.

Accordingly, there is a need for an improved approach to compensating for changes in environmental conditions associated with a disc drive without adversely impacting data transfer rates of the disc drive.

SUMMARY OF THE INVENTION

The present invention provides a method and apparatus for improving the operational response of a disc drive. Particularly, in accordance with the preferred embodiment, compensation routines are performed to adjust disc drive parameters in accordance with existing environmental conditions during an idle mode of operation of the drive.

At such time that a selected, uninterrupted amount of time passes since the most recently performed disc drive operation, the disc drive enters the idle mode and performs a predetermined sequence of the compensation routines in order to calibrate various disc drive control system parameters in view of the current environmental conditions for the disc drive. Once the compensation routines have been performed, the disc drive performs a dithering operation in which heads of the disc drive are positioned about various locations with respect to the corresponding discs of the disc drive.

The dithering operation is preferably performed for a selected period of time, after which the compensation routines are subsequently performed. Moreover, the compensation routines are organized in a table defining a predetermined sequence for the compensation routines, and this table is reordered so that the compensation routines are subsequently performed in a different order. During the idle mode, the disc drive continuously monitors for the receipt of a command from a host computer to resume operation, at which time the disc drive exits the idle mode and resumes operation.

These and various other features as well as advantages which characterize the present invention will be apparent from a reading of the following detailed description and a review of the associated drawings.

BRIEF DESCRIPTION OF THE DRAWINGS

FIG. 3 provides a functional block diagram of the servo control circuit of the disc drive of FIGS. 1 and 2.

FIG. 4 provides a functional block diagram of the read channel of the disc drive of FIGS. 1 and 2.

FIG. 5 provides a table of typical compensation routines that can advantageously be performed in accordance with the preferred embodiment of the present invention.

FIG. 6 provides a generalized flow chart representative of programming used by the system microprocessor of FIG. 2 in accordance with the preferred embodiment of the present invention.

DETAILED DESCRIPTION

Figure 1:
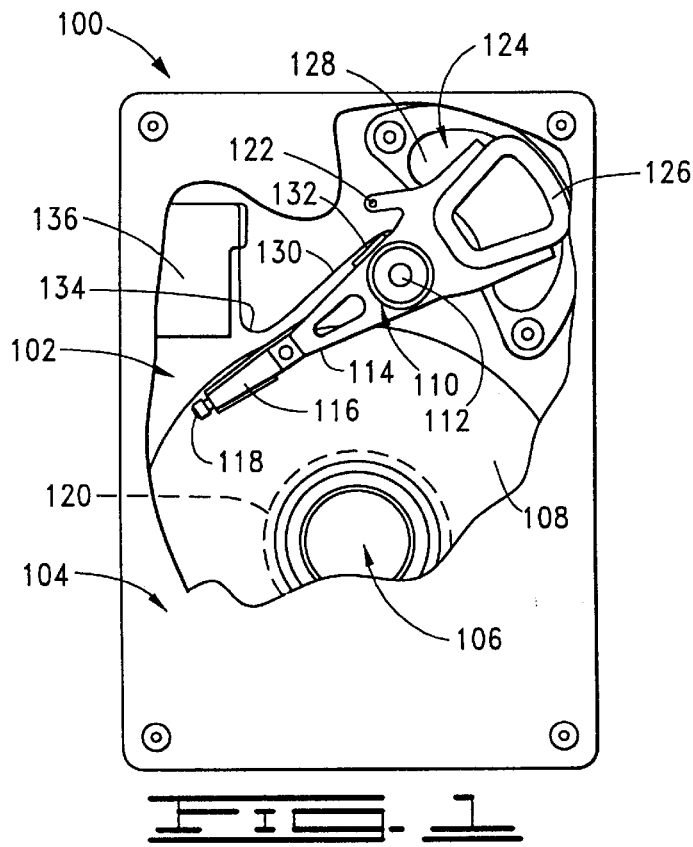
FIG. 1 is a disc drive constructed in accordance with the preferred embodiment of the present invention.

Referring now to FIG. 1, shown therein is a disc drive 100 constructed in accordance with the preferred embodiment of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

At such time that the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which will be recognized as typically including a coil 126 attached to the actuator assembly 110, as well as one or more permanent magnets 128 which establish a magnetic field in which the coil 126 is immersed. Thus, the controlled application of current to the coil 126 results in a magnetic interaction between the permanent magnets 128 and the coil 126 so as to cause the coil 126 to move in accordance with the well known Lorentz relationship. As the coil 126 moves, the actuator assembly 110 pivots about the bearing shaft assembly 112 and the heads 118 are caused to move across the surfaces of the discs 108.

A flex assembly 130 is provided to provide the requisite electrical connection paths for the actuator assembly 110 while allowing pivotal movement of the actuator assembly 110 during operation. The flex assembly includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
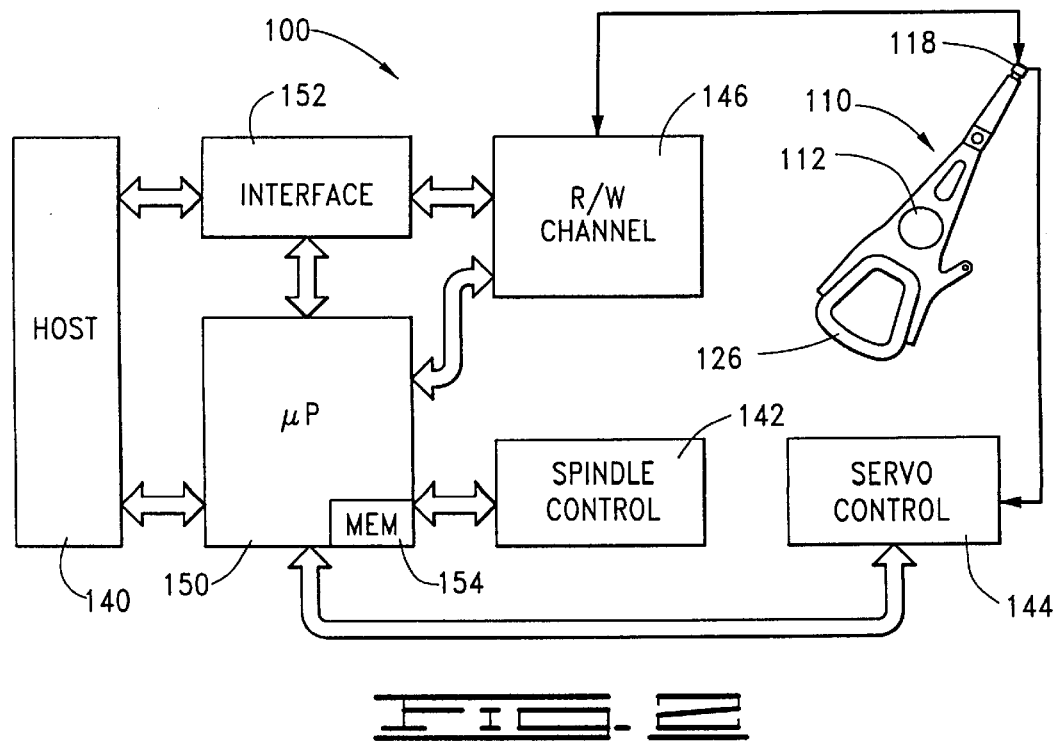
FIG. 2 provides a functional block diagram of the disc drive of FIG. 1 operably connected to a host computer in which the disc drive can be mounted.

Referring now to FIG. 2, shown therein is a functional block diagram of the disc drive 100 of FIG. 1, generally illustrating the main functional circuits which are resident on the disc drive printed circuit board and used to control the operation of the disc drive 100. As shown in FIG. 2, the disc drive 100 is controlled by a host computer 140 in which the disc drive 100 is mounted.

The disc drive 100 generally comprises a spindle control circuit 142, a servo control circuit 144 and a read/write channel 146, all operably connected to a system microprocessor 150. It will be recognized that the system microprocessor 150 communicates with and controls the operation of these circuits in a known manner, with the exceptions as discussed below. Additionally, an interface circuit 152 is shown connected to the read/write channel 146 and to the system microprocessor 150, with the interface circuit 152 serving as a conventional data interface and buffer for the disc drive 100.

As will be recognized, the spindle control circuit 142 controls the rotational speed of the spindle motor 106 (FIG. 1) in a conventional manner. For reference, disc drives of the present generation rotate discs at speeds up to 10,000 revolutions per minute. Additional discussion regarding spindle control circuits is provided in copending U.S. Pat. No. 5,631,999 entitled ADAPTIVE COMPENSATION FOR HARD DISC DRIVE SPINDLE MOTOR MANUFACTURING TOLERANCES, issued May 20, 1997 to Dinsmore, assigned to the assignee of the present invention.

As discussed above, the radial position of the heads 118 is controlled through the application of current to the coil 126 of the actuator assembly 110. Such control is provided by the servo control circuit 144, a functional block diagram of which is provided in FIG. 3.

Referring now to FIG. 3, the servo control circuit 144 includes a preamp circuit 162, a servo data and decode circuit 164, a servo processor 166 with associated servo RAM 168 and a VCM control circuit 170, all of which cooperate in a known manner to control the position of the head 118. For reference, the servo processor 166 preferably comprises a digital signal processor (DSP).

It will be recognized that servo control generally includes two main types of operation: seeking and track following. A seek operation entails moving a selected head 118 from an initial track to a destination track on the associated disc surface through the initial acceleration and subsequent deceleration of the head 118 away from the initial track and towards the destination track. Once the head 118 is settled on the destination track, the disc drive enters a track following mode of operation wherein the head 118 is caused to follow the destination track until the next seek operation is to be performed. Such operations are well known in the art and are discussed, for example, in U.S. Pat. No. 5,262,907 entitled HARD DISC DRIVE WITH IMPROVED SERVO SYSTEM, issued Nov. 16, 1993 to Duffy et al., as well as in U.S. Pat. No. 5,475,545 entitled METHOD FOR REDUCING NOISE DURING SEEKS IN A HARD DISK DRIVE, issued Dec. 12, 1995 to Hampshire et al.

A track following mode of operation entails the continued positioning of the head 118 over a selected track. Particularly, analog burst signals are provided by the head 118 at such time that servo information written to the disc 108 during disc drive manufacturing passes under the head 118. The burst signals are amplified by the preamp circuit 162 and provided to the servo data decode circuit 164, which includes analog-to-digital converter (ADC) circuitry that converts the analog burst signals to digital form.

The digitized signals are provided to the servo processor 166, which determines a position error signal (PES) from the relative magnitudes of the digital representations of the burst signals and, in accordance with commands received from the disc drive microprocessor 150 (FIG. 2), determines the desired position of the head 118 with respect to the track. It will be recognized that, generally, the optimal position for the head 118 with respect to the track being followed is over track center, but offsets (as a percentage of the width of the track) can be advantageously employed during, for example, error recovery routines. In response to the desired relative position of the head 118, the servo processor 166 outputs a current command signal to the VCM control circuit 170, which includes an actuator driver (not separately designated) that applies current of a selected magnitude and direction to the coil 126 in response to the current command signal. Additional discussion regarding track following is provided in the previously referenced Duffy U.S. Pat. No. 5,262,907.

Referring back to FIG. 2, the read/write channel 146 is used to control the transfer of user data between the host computer 140 and the discs 108. Generally, the read/write channel 146 operates to write data to the disc 108 in response to user data provided to the channel from the interface circuit 152 by encoding and serializing the data and generating a write current utilized by the head 108 to selectively magnetize portions of a selected track on the disc 108. Correspondingly, the previously stored data is retrieved by the read/write channel 146 by reconstructing the data from the read signals generated by the head 118 as the head passes over the selected track on the disc 108. A functional block diagram for the read/write channel 146 is provided in FIG. 4.

Referring to FIG. 4, the read/write channel 146 is shown to generally comprise a write channel 180 and a read channel 190. During a write operation, user data to be written to the disc 108 is provided by the interface circuit 152 (FIG. 2) on signal path 202 to an error correction code (ECC) encoder 204 of the write channel 180. The ECC encoder 204 appends appropriate ECC code symbols to corresponding groups of data symbols of the user data in order to enhance the ability of the read channel to subsequently recover the user data from the disc 108. Such error detection and correction techniques are well known and are discussed, for example, in U.S. Pat. No. 5,276,662 entitled DISC DRIVE WITH IMPROVED DATA TRANSFER MANAGEMENT APPARATUS, issued Jan. 4, 1994 to Shaver et al. and in copending U.S. patent application Ser. No. 08/393,431 entitled CORRECTING UP TO TWO READ ERRORS IN A DISC DRIVE AND DETECTING THE OCCURRENCE OF MORE THAN TWO READ ERRORS, filed Feb. 23, 1995 by Deng et al.

The data and code symbols are provided to a run-length limited (RLL) encoder 206, which provides run length limited encoding of the data to facilitate the generation of timing clocks used by the read channel 190. Typical RLL encoding schemes include 8/9 and 16/17 encoding, as is known in the art. A serializer circuit 208 serializes the RLL encoded data and code symbols and generates a corresponding write current used by the head 118 to selectively magnetize the track.

During a read operation, the head 118 provides read signals indicative of the selective magnetization of the track to a threshold/preamp circuit 210 of the read channel 190, the threshold/preamp circuit 210 providing threshold detection and preamplification of the read signal. A variable gain amplifier (VGA) 212 amplifies the read signal and an adaptive prefilter 214 provides low pass filtering to reduce high frequency noise components in the read signal to enhance data recovery.

The filtered read signal is provided to a transversal equalizer 216, which provides time-domain equalization and self-synchronization of the read signal. Particularly, time-domain equalization is used to reshape a readback signal received by the channel to an approximation of a desired target waveform in the time domain, such as used in PRML class PR-4 detection. Reshaping the readback signal allows intersymbol interference (ISI) to be reduced and controlled and facilitates sequential decoding of the digital information stored on the disc. The transversal equalizer 216 preferably uses control inputs (not shown) including tap weights and adaptive timing parameters provided to delay stages (not shown) in the transversal equalizer 216, such control inputs being provided by the system microprocessor 150. Such control inputs enable the transversal equalizer 216 to adapt to variations in transfer rate as well as changes in environmental conditions. For additional discussion of PRML signal processing, see the previously referenced Minuhin U.S. Pat. No. 5,592,340 (analog equalizer circuitry) as well as U.S. Pat. No. 5,422,760 entitled DISK DRIVE METHOD USING ZONED DATA RECORDING AND PRML SAMPLING DATA DETECTION WITH DIGITAL ADAPTIVE EQUALIZATION, issued Jun. 6, 1995 to Abbott et al. (digital equalizer, timing and decoder circuitry) and U.S. Pat. No. 5,459,757entitled TIMING AND GAIN CONTROL CIRCUIT FOR A PRML READ CHANNEL, issued Oct. 17, 1995 to Minuhin et al. (analog timing and decoder circuitry).

Continuing with FIG. 4, the output of the transversal equalizer 216 is sampled (digitized) by an analog to digital (A/D) converter 218, and these samples are used by a timing and gain control circuit 220 to adjust the gain of the VGA 212, as well as to adjust the frequency of a PLL (not separately shown) used by a Viterbi decoder 222 to decode read data from the samples obtained from the transversal equalizer 216.

The sequence recovered by the Viterbi decoder 222 is provided to an RLL decoder 224, which converts the recovered sequence back to the corresponding data and code symbols. These symbols are then provided to an ECC circuit 226, which performs error detection and correction upon the received sequence (using, for example Reed-Solomon codes) and, if no uncorrectable errors are present, outputs the data to the interface circuit 152 (FIG. 2) on signal path 228 for subsequent transfer to the host computer 140.

Having concluded the discussion of the general construction and operation of the disc drive 100 with respect to FIGS. 1 through 4, reference is now made to FIG. 5 which illustrates a table of conventional compensation routines which can be advantageously used accordance with the preferred embodiment of the present invention. It will be recognized that the routines in the table of FIG. 5 are merely illustrative in nature and that other suitable disc drive compensation routines could readily be performed in accordance with the following discussion.

For purposes of clarity, however, the compensation table of FIG. 5 is shown to include a SERVO GAIN CALIBRATION routine, which adjusts the gain of the servo control circuit of FIG. 3 to a level suitable for existing environmental conditions; a REPEATABLE RUN OUT COMPENSATION routine, which compensates for repeated run out components in the PES at a frequency associated with the rotational speed of the discs 108; a VCM TORQUE COMPENSATION routine, which compensates for variations in the torque characteristics of the VCM, which as will be recognized are significantly affected by changes in the temperature of the VCM; a BIAS FORCE COMPENSA- TION routine, which generally involves measuring the bias forces upon the actuator assembly 110 at different locations of the disc 108, which as will be recognized vary not only with regard to environmental conditions, but also with regard to the rotational direction of the actuator assembly 110; and an ADAPT READ CHANNEL routine, which involves the adaptation of various read channel gain and filter parameters to optimize the read channel for environmental conditions. Such routines are preferably realized in programming utilized by either the system microprocessor 150 (FIG. 2) or the servo processor 166 (FIG. 3). The table of FIG. 5 is realized in memory (MEM) 154 (FIG. 2) utilized by the system microprocessor 150.

Referring now to FIG. 6, shown therein is a generalized flow chart illustrating an IDLE COMPENSATION routine utilized by the system microprocessor 150 in carrying out the preferred embodiment of the present invention. Particularly, the IDLE COMPENSATION routine of FIG. 6 optimizes the operational performance of the disc drive 100 by sequentially performing the compensation routines of FIG. 5 at such time that the disc drive 100 enters an idle mode of operation. It is contemplated that the routine of FIG. 6 will be implemented as a top level routine and will continuously run in conjunction with other conventional routines that are used by the system microprocessor 150 to control the operation of the disc drive 100.

FIG. 6 shows the IDLE COMPENSATION routine to begin at decision block 232, wherein the system microprocessor 150 determines whether the disc drive 100 is idle. Whereas a variety of methodologies exist whereby such an idle mode of operation can be declared, in the preferred embodiment the disc drive 100 is determined to be idle after the passage of a selected amount of time (such as, for example 500 milliseconds) without the receipt or issuance of a command by the host 140. Thus, as will be recognized an idle mode of operation involves a period of time wherein the disc drive 100 is not being utilized to transfer data between the discs 108 and the host computer 140; that is, the disc drive 100 is considered to be idle when a sufficient amount of time has passed since the most recent disc drive operation and the disc drive 100 is awaiting the receipt of a command from the host computer 140.

Until such time that the disc drive 100 enters the idle mode of operation, the routine of FIG. 6 proceeds from the decision block 232 to a decision block 234, wherein the system microprocessor 150 determines whether a host command has been issued. As will be recognized, such a command will result in an interrupt that halts further execution of presently executed routines while the system microprocessor 150 performs the issued command (or otherwise services the interrupt).

At such time that the selected amount of time elapses so that an idle condition exists, the routine of FIG. 6 proceeds from the decision block 232 to a COMPENSATION TABLE block 236 which causes the system microprocessor 150 to direct the sequential performance of the calibration routines of FIG. 5. Thus, for the calibration table ordered as shown in FIG. 5, the disc drive 100 will proceed to first perform the SERVO GAIN CALIBRATION routine, followed by the REPEATABLE RUN OUT COMPENSATION routine, and so on through the rest of the table. Although not explicitly set forth in FIG. 6 for purposes of clarity, it is expressly contemplated that in the preferred embodiment the receipt of a command during the execution of the compensation routines of block 236 will cause the routine to exit at such point and the system microprocessor 150 will proceed to service the interrupt.

Once the routine of FIG. 6 exits the COMPENSATION TABLE block 236 (either as a result of the receipt of an interrupt or as a result of the completion of each of the compensation routines therein), the compensation table is preferably reordered, so that a different sequence of the compensation routines is performed the next time that the routine of FIG. 6 executes block 236. Such reordering is performed to ensure that, over time, each of the various compensation routines are generally performed on an equal basis to facilitate the ability of the disc drive 100 to resume operation at an optimal performance level. Of course, should selected calibration routines be deemed particularly useful in facilitating optimal disc drive performance (such as the SERVO GAIN CALIBRATION routine), such routines could continue to be the first routines performed each time block 236 is executed and the remaining routines could be reordered by the operation of block 238.

Finally, at such time that an idle mode of operation lasts a sufficient amount of time so that all of the calibration routines of block 236 have been executed, and after the table has been reordered by block 238, the routine of FIG. 6 continues to block 240 wherein the disc drive 100 enters a dither mode of operation. As will be recognized, dithering generally comprises the sequential movement of the heads 118 about various locations on the disc 100 so as to limit the time that the heads 118 remain over any particular track. It will be recognized that prior art disc drives have typically performed dithering during disc drive idle periods until an interrupt is received. In the preferred embodiment of the present invention, however, the dithering operation of block 240 is generally limited to a selected amount of time, after which the routine of FIG. 6 returns to the COMPENSATION TABLE of block 236. As will be recognized, such operation is provided to account for continued changes in environmental conditions during extended idle periods.

As will now be recognized by those skilled in the art, the present invention provides a significant advantage over the prior art, in that the disc drive 100 discussed above will take advantage of times during which the disc drive 100 is idle to perform compensation routines designed to adjust the operation of the disc drive 100 in accordance with currently existing environmental conditions. Such operation will improve the likelihood that the disc drive 100 will be able to exit the idle mode and resume operation at an optimal performance level, regardless of the length of the idle period and the changes in environmental conditions experienced therein.

In accordance with the foregoing, it will be recognized that the present invention as embodied herein describes an apparatus and associated method for improving the operational performance of a disc drive (such as 100, FIG. 1). After a selected period of disc drive inactivity, an idle mode of operation is determined (block 232, FIG. 6), after which compensation routines are performed (block 236) in order to adjust disc drive parameters in accordance with existing environmental conditions. For idle modes of sufficient duration, a dithering operation is subsequently performed (block 240, FIG. 6) in which the head (118, FIGS. 1–4) is selectively moved about various locations on the disc (108, FIGS. 1 and 3). The compensation routines are organized in the form of a table (FIG. 5) which is preferably reordered (block 238, FIG. 6) upon completion of the compensation routines (block 236, FIG. 6).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:

idle detection means for detecting an idle condition for the disc drive, the idle condition comprising the passage of a selected, uninterrupted amount of time since the most recently performed disc drive operation; and compensation means, responsive to the idle detection means, for compensating for changes in environmental conditions associated with the disc drive by adjusting selected disc drive parameters in order to optimize subsequent disc drive performance, wherein the compensation means utilizes a table of compensation routines, the compensation routines performed in a sequence determined by the order in which the compensation routines appear in the table, wherein the compensation means further reorders the table of compensation routines once at least selected ones of the compensation routines have been performed so that the compensation routines are subsequently performed in a new sequence determined in accordance with the reordering of the table of compensation routines.

2. The disc drive of claim 1, further comprising:

dithering means for performing a dithering operation at such time that each of the compensation routines in the table of compensation routines has been performed.

3. In a disc drive of the type having a disc and an actuator assembly adjacent the disc, the actuator assembly including a head that is controllably positionable with respect to tracks on the disc, the disc drive further comprising a read/write channel responsive to the head for transferring data between the disc and a host computer, a method for optimizing data transfer performance of the disc drive, comprising steps of:

(a) determining that the disc drive has entered an idle mode of operation, the idle mode of operation comprising the passage of a selected uninterrupted amount of time since the most recently performed disc drive operation; and (b) compensating for changes in environmental conditions associated with the disc drive through the adjustment of selected disc drive parameters in order to optimize subsequent performance of the disc drive, comprising steps of;

(b1) providing a plurality of compensation routines in a first sequence;

(b2) performing the compensation routines in the first sequence while the disc drive is in the idle mode of operation; and (b3) rearranging the compensation routines in a second sequence different from the first sequence so that the compensation routines are subsequently performed in the second sequence.

4. The method of claim 3, further characterized by:

(c) performing a dithering operation at such time that the selected disc drive parameters have been adjusted.

5. The method of claim 4, wherein step (c) is performed for a selected period of time, after which step (b) is repeated.

* * * * *

UNITED STATES PATENT AND TRADEMARK OFFICE
CERTIFICATE OF CORRECTION

PATENT NO. : 6,018,432
DATED : January 25, 2000
INVENTOR(S) : Anish A. Ukani

Page 1 of 1

It is certified that error appears in the above-identified patent and that said Letters Patent is hereby corrected as shown below:

Column 1,
Line 48, replace Pat. No. 5,585,976entitled" with -- Pat. No. 5,585,976 entitled --.
Line 52, replace Pat. No. 5,305,160entitled" with -- Pat. No. 5,305,160 entitled --.

Column 4,
Line 52, replace "1993to" with -- 1993 to --.

Column 6,
Line 25, replace "Pat. No. 5459757entitled" with -- Pat. No. 5,459,757 entitled --
Line 50, replace "used accordance" with -- used in accordance --.

Signed and Sealed this

Fifth Day of March, 2002

Attest:

Attesting Officer

JAMES E. ROGAN
*Director of the United States Patent and Trademark Office*